US010476569B1

(12) United States Patent
Hsu et al.

(10) Patent No.: US 10,476,569 B1
(45) Date of Patent: Nov. 12, 2019

(54) ANTENNA SELECTION FOR INTERFERENCE AVOIDANCE

(71) Applicant: AMAZON TECHNOLOGIES, INC., Seattle, WA (US)

(72) Inventors: Morris Yuanhsiang Hsu, Sunnyvale, CA (US); Rohit Sammeta, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 363 days.

(21) Appl. No.: 15/362,219

(22) Filed: Nov. 28, 2016

(51) Int. Cl.
*H04B 7/06* (2006.01)
*H04W 72/12* (2009.01)
*H04W 84/12* (2009.01)
*H04W 4/80* (2018.01)

(52) U.S. Cl.
CPC ...... *H04B 7/0604* (2013.01); *H04W 72/1263* (2013.01); *H04W 4/80* (2018.02); *H04W 84/12* (2013.01)

(58) Field of Classification Search
None
See application file for complete search history.

(56) References Cited

U.S. PATENT DOCUMENTS

| | | | | |
|---|---|---|---|---|
| 2002/0003774 A1* | 1/2002 | Wang | ................ | H04B 7/0669 370/208 |
| 2004/0160921 A1* | 8/2004 | Kaipainen | ............ | H04B 7/0619 370/335 |
| 2009/0149139 A1* | 6/2009 | Harel | .................. | H04B 7/0617 455/101 |
| 2009/0258607 A1* | 10/2009 | Beninghaus | ........ | H04B 1/3805 455/77 |
| 2009/0323652 A1* | 12/2009 | Chen | ..................... | H04B 1/406 370/338 |
| 2010/0091731 A1* | 4/2010 | Kim | ...................... | H04W 16/14 370/329 |
| 2011/0286372 A1* | 11/2011 | Taghavi Nasrabadi | ..................... | H04B 7/0851 370/310 |
| 2014/0359384 A1* | 12/2014 | Gu | ..................... | G01R 31/3177 714/724 |
| 2015/0116153 A1* | 4/2015 | Chen | ....................... | H01Q 5/22 342/359 |

(Continued)

*Primary Examiner* — Phirin Sam
*Assistant Examiner* — Mariela Vidal Carpio
(74) *Attorney, Agent, or Firm* — Lowenstein Sandler LLP (57) ABSTRACT

Described herein are technologies for intelligent antenna selection for optimal performance in an electronic device. One electronic device includes a first radio, coupled to a first antenna and a second antenna, and a processing device coupled to the first radio. During a first period, the first radio transmits a sequence of data packets using the first antenna and the processing device receives a first metric value indicative of a first amount of power received on a third antenna of the second electronic device. During a second period, the first radio transmits the sequence using the second antenna and the processing device receives a second metric value indicative of a second mount of power received on the third antenna. The processing device selects one of the first antenna and the second antenna as a selected antenna based on which one of the first metric value and the second metric value is lower. The processing device causes the first radio to communicate data with a third device using the selected antenna.

20 Claims, 6 Drawing Sheets

(56) References Cited

U.S. PATENT DOCUMENTS

| | | | |
|---|---|---|---|
| 2015/0244432 A1* | 8/2015 | Wang | H04B 7/0695 |
| | | | 375/267 |
| 2018/0084439 A1* | 3/2018 | Li | H04W 16/28 |
| 2018/0198507 A1* | 7/2018 | Cheng | H04B 7/0695 |

* cited by examiner

FIG. 6

ANTENNA SELECTION FOR INTERFERENCE AVOIDANCE

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Described herein are technologies for intelligent antenna selection for interference avoidance in an electronic device. One electronic device includes a first radio, coupled to a first antenna and a second antenna, and a processing device coupled to the first radio. During a first period, the first radio transmits a sequence of data packets using the first antenna and the processing device receives a first metric value indicative of a first amount of power received on a third antenna of the second electronic device. During a second period, the first radio transmits the sequence using the second antenna and the processing device receives a second metric value indicative of a second amount of power received on the third antenna. The processing device selects one of the first antenna and the second antenna as a selected antenna based on which one of the first metric value and the second metric value is lower. In one embodiment, the processing device determines that the first metric value is lower than the second metric value and selects the first antenna to communicate data with a third device. The processing device causes the first radio to communicate data with a third device using the first antenna. In another embodiment, the processing device determines that the second metric value is lower than the first metric value and selects the second antenna to communicate data with a third device. The processing device causes the first radio to communicate data with a third device using the second antenna.

To support compact devices with multiple radios operating in the same frequency band, some implementations use a time-switched radio architecture, such as described below and illustrated in FIG. 1A.

Figure 1A:
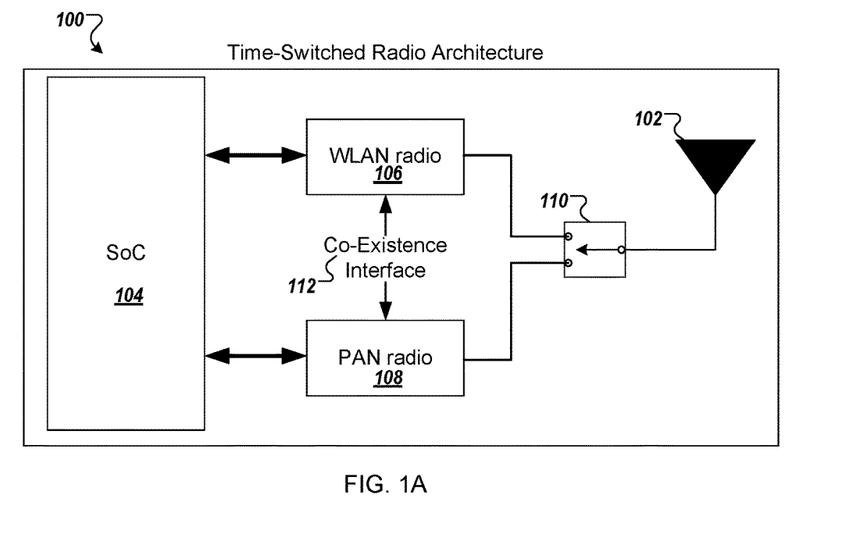
FIG. 1A is a block diagram of an electronic device with a time-switched radio architecture according to one implementation.
Figure 1B:
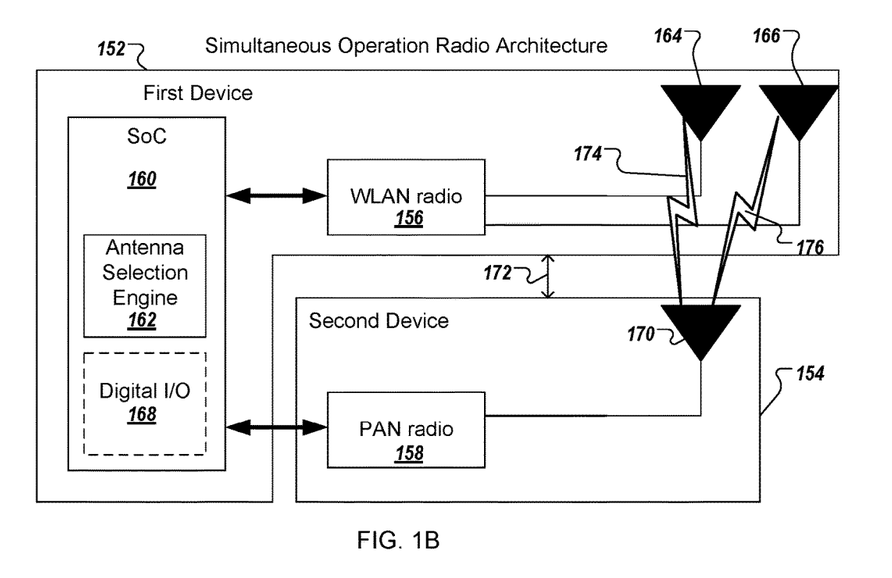
FIG. 1B is a block diagram of electronic devices with an antenna selection engine for interference avoidance according to one embodiment.

FIG. 1A is a block diagram of an electronic device 100 with a time-switched radio architecture according to one implementation. The electronic device 100 includes a wireless local area network (WLAN) radio 106 and a personal area network (PAN) radio 108, each coupled to a processing device 104 (such as a System on Chip (SoC)) and each coupled to an antenna 102 via a switch 110. In this architecture, a single radio can transmit or receive at any given time, and there is no performance degradation due to inter-radio interference during this time slot. However, the electronic device 100 has poor data throughput and higher latency because of the need to switch between the two radios. In order to improve spectrum usage, to reduce latency, and to increase data throughput, there is a rising interest to implement radio architectures that permit simultaneous operations by radios. In some implementations, there is co-existence support technology that uses a co-existence interface 112 to coordinate when and what each of the radios are transmitting so that unwanted signals from the other radio can be canceled. With the co-existence interface 112, the WLAN radio 106 and the PAN radio 108 can communicate on a packet level to coordinate transmissions to avoid or mitigate interference. The embodiments described herein of antenna selection for interference avoidance may permit simultaneous or concurrent operations by multiple radios, such as illustrated in FIG. 1B. The embodiments described herein permit the two radios to communicate simultaneously even when the two radios cannot communicate with one another at a packet level as described herein. The embodiments described herein can perform antenna selection without the co-existence interface 112. That is, there is no dedicated and direct interface between the radios for packet-level communications to coordinate operations of the two radios. Packet-based communications tend to occur in bursts and the speed of message exchanges between radios packet level communication. When there is no dedicated and direct interface between the radios, the messaging between radios through a processing device (e.g., SoC 160) would not be fast enough for a radio to act on messages from the other radio. For example, WLAN messages may operate on an order of nanoseconds and messaging through the SoC 160 between the WLAN radio 156 and the PAN radio 158 may not be fast enough for the WLAN radio 156 to act upon a message sent by the PAN radio 158 as it pertains to antenna switching. Once the message gets relayed through the SoC 160 and processed by a radio receiving the message, the other radio sending the message cannot hold on long enough to effectively control transmissions by the two radios. Also, the embodiments described herein can perform antenna selection without packet-level arbitration for the two radios. Packet-level arbitration can be easier to achieve when the two radios are on the same integrated circuit than when the two radios are on different integrated circuits, and more so when there is no dedicated and direct interface between the two radios.

In another embodiment, one system includes a first electronic device with an enclosure; a processing device disposed within the enclosure; a wireless local area network (WLAN) radio coupled to the processing device; a primary antenna coupled to the WLAN radio and disposed within the enclosure; and a diversity antenna coupled to the WLAN radio and disposed within the enclosure. The WLAN radio causes the primary antenna, the diversity antenna, or both to radiate electromagnetic energy in an industrial, scientific and medical (ISM) radio band, such as the 2.4 GHz ISM band. In another embodiment, the first radio causes the first antenna to radiate electromagnetic energy in an unlicensed frequency band and causes the second antenna to radiate electromagnetic energy in the unlicensed frequency band. The second radio causes the third antenna to radiate electromagnetic energy in the unlicensed frequency band. The system also includes a second electronic device disposed within a dongle enclosure, the dongle enclosure being part of a power cable. The power cable supplies power to the first electronic device and the second electronic device. The second electronic device includes a personal area network (PAN) radio and a third antenna coupled to the PAN radio. The PAN radio causes the third antenna to radiate electromagnetic energy in the ISM radio band. The processing device can set the PAN radio into a channel sweep mode in which the PAN radio measures an amount of power received by the third antenna on multiple channels of the PAN radio. The processing device can cause the WLAN radio to transmit a sequence of data packets using only the primary antenna during a first period and cause the WLAN radio to transmit the sequence of data packets using only the diversity antenna during a second period. After, the processing device receives a first metric value from the PAN radio and a second metric value from the PAN radio. The first metric value is indicative of a first amount of power received on the third antenna on multiple channels during the first period. The second metric value is indicative of a second amount of power received on the third antenna on the multiple channels during the second period. The processing device selects one of the primary antenna or the diversity antenna as a selected antenna based on which of the first metric value and the second metric value is lower. The processing device causes the WLAN radio to communicate WLAN data with a third device using the selected antenna during a third period. The third period is after the first period and the second period. The processing device causes the PAN radio to communicate PAN data with a fourth device using the third antenna during the third period. In one embodiment, at least a portion of the WLAN data and at least a portion of the PAN data are communicated concurrently in the ISM radio band.

In a further embodiment, the first electronic device is a webcam or other camera device. The webcam includes a camera coupled to the processing device. In one embodiment of the webcam, the primary antenna is disposed on a first plane within the enclosure and the diversity antenna is disposed on a second plane within the enclosure, the second plane being orthogonal to the first plane.

In another embodiment, the first radio uses a first wireless technology standard and the second radio uses a second wireless technology standard that is different than the first wireless technology standard. For example, the first radio may be a RF integrated circuit that implements the Wi-Fi® technology and the second radio may be a separate RF integrated circuit that implements the Zigbee® technology, the Bluetooth® technology, or other PAN technologies.

FIG. 1B is a block diagram of electronic devices 152, 154 with an antenna selection engine 162 for interference avoidance according to one embodiment. In this architecture, a first device 152 includes an application processor 160, such as a SoC, a WLAN radio 156, and a second device 154 includes a PAN radio 158. Although the first device 152 and the second device 154 are illustrated in FIG. 1B as separate devices, it should be noted that these two devices may be part of a single electronic product or electronic system. For example, the electronic product may be a web camera (also referred to as webcam) in which the first device 152 is a camera assembly with one or more integrated circuits (including WLAN radio 156) disposed within a first enclosure and the second device 154 is one or more integrated circuits (including the PAN radio 158) disposed within a dongle enclosure, the dongle enclosure being part of a power cable coupled to the first enclosure. The power cable may supply power to the first device 152 and the second device 154.

The WLAN radio 156 is coupled to a primary antenna 164 (also referred to herein as "first antenna") and a diversity antenna 166 (also referred to herein as "second antenna"). The WLAN radio 156 can cause the primary antenna 164, the diversity antenna 166, or both to radiate electromagnetic energy in an industrial, scientific and medical (ISM) radio band, such as the 2.4 GHz ISM band (also referred to as the "2.4 GHz band"). In one embodiment, the WLAN radio 156 uses the Wi-Fi® technology, developed by the Wi-Fi Alliance, and can implement various 802.11 standards. In some embodiments, the WLAN radio 156 can be a standalone integrated circuit. In other embodiments, the WLAN radio 156 can be integrated into one or more integrated circuits of the system, such as integrated into the SoC 160 or other processing devices. The WLAN radio 156 can implement WLAN standards, such as the Wi-Fi® 802.11 wireless standards. The PAN radio 158 is coupled to an antenna 170 (also referred to herein as "third antenna").

The PAN radio 158 is coupled to an antenna 170 (also referred to herein as "third antenna"). In some embodiments, the PAN radio 158 is located within the second device 154. The PAN radio 158 can cause the third antenna 170 to radiate electromagnetic energy in the same ISM radio band as the WLAN radio 156, such as the 2.4 GHz ISM band. The PAN radio 158 may implement the Bluetooth® technology, the Zigbee® technology, or any other PAN technology. In other embodiments, instead of a PAN radio, the second device 154 may include another WLAN radio that also operates in the same ISM band. In some embodiments, the PAN radio 158 can be a standalone integrated circuit. In other embodiments, the PAN radio 158 can be integrated into one or more integrated circuits with other circuitry. The PAN radio 158 can implement PAN standards, such as the BT or BTLE wireless standards, the Zigbee® wireless standards, or the like.

In this architecture, both the WLAN radio 156 and the PAN radio 158 can operate at the same time. It should be noted that since both radios operate at the same time, one device's transmit signal will present itself as unwanted signal at the other device's receiver, causing interference. Because of this interference, the operable range may be significantly reduced, if not avoided or mitigated. For example, to maximize the operable range, an isolation of at least 60 dB is required between the two radios' antennas. However, this isolation is difficult to achieve in compact consumer electronics. Using the embodiments of antenna selection for interference avoidance, both the WLAN radio 156 and PAN radio 158 can transmit and receive simultaneously or concurrently because the isolation between the radios is increased as described herein. That is, the antenna selection technology increase the isolation between the radios so that at least a portion of data communicated by the WLAN radio 156 can be communicated concurrently with at least a portion of the data communicated by the PAN radio 158.

In some embodiments where time-switching is not available, a system may include radio chipsets that do not include co-existence support, like through the co-existence interface 112 of FIG. 1A. In order to increase isolation between the radios, spatial separation 172 between the WLAN radio's antennas and the PAN radio's antenna radios may be used to improve a first isolation 174 between the primary antenna 164 and the third antenna 170, a second isolation 176 between the diversity antenna 166 and the third antenna 170, or both. In other embodiments, radiation pattern diversity may be used to further improve isolation between at least one of the primary antenna 164 and diversity antenna 166 and the third antenna 170. The antenna selection engine 162 can be used for selecting one of multiple antennas, such as either the primary antenna 164 or the diversity antenna 166, to reduce or avoid interference. For example, the antenna selection engine 162 can determine whether the first isolation 174 or the second isolation 176 is better for selecting one of the primary antenna 164 or diversity antenna 166 for communicating simultaneously or concurrently with the PAN radio 158 to avoid or reduce interference. The antenna selection engine 162 may be at least partially performed by processing logic that may include hardware (e.g., circuitry, dedicated logic, programmable logic, microcode, etc.), software (e.g., instructions executed by a processing device), firmware, or any combination thereof.

Figure 2:
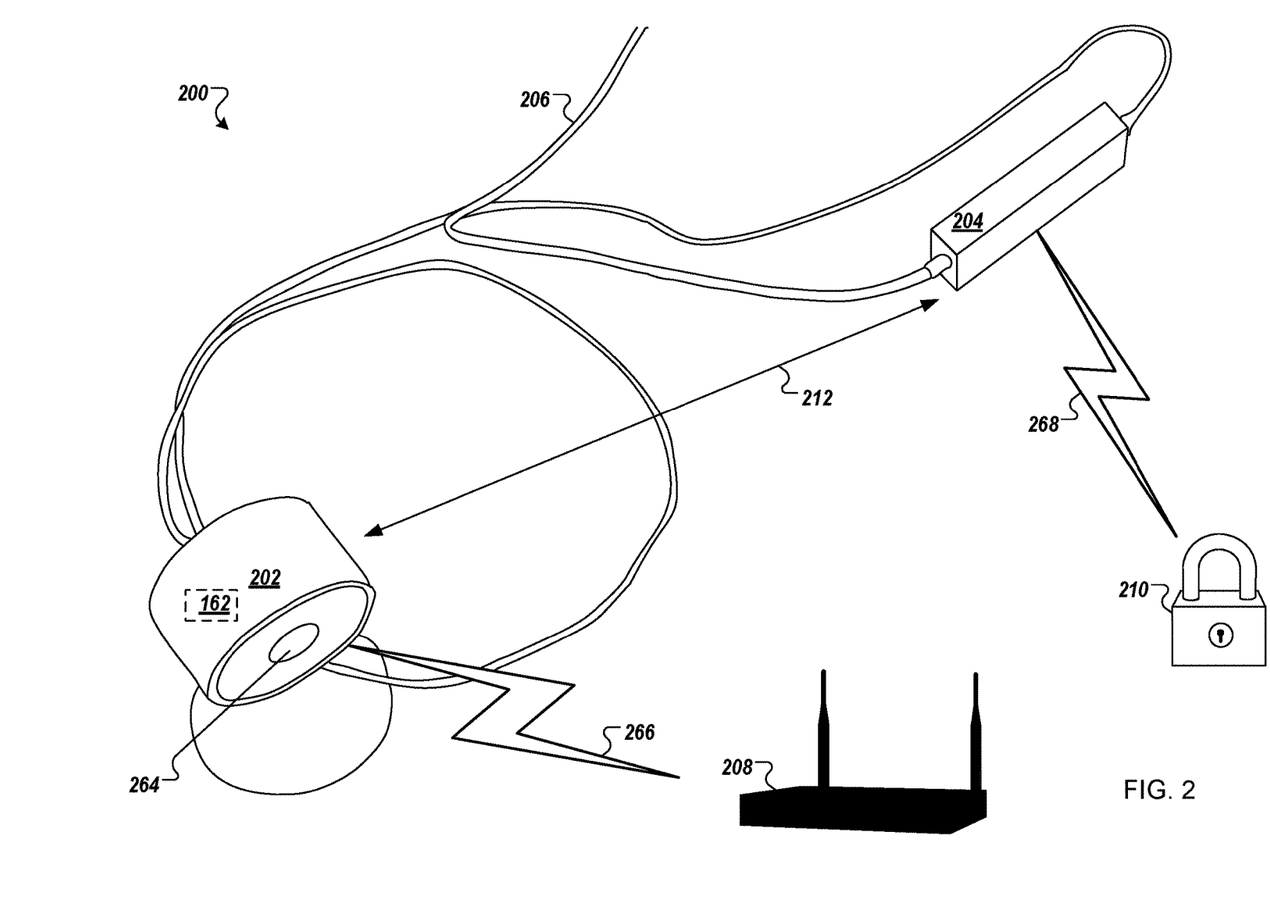
FIG. 2 is a network diagram of an electronic product having two devices electronic devices with antenna selection for interference avoidance according to one embodiment.

In one embodiment, one radio (RF chipset) may be disposed within a first enclosure and another radio (another RF chipset) may be disposed within a second enclosure that is separated from the first enclosure. For example, as illustrated in FIG. 2, the second radio may be disposed in a dongle enclosure on a power cable such that spatial isolation could be increased. In some cases, the spatial isolation between the radio and antenna in the second enclosure and the radio and antennas in the first enclosure is unknown or is not fixed. For example, when the second enclosure is on a power cable, the power cable is flexible and it is possible that the second enclosure can be disposed in close proximity to the first enclosure. The processing device 160 can communicate with the PAN radio 158 using a digital input/output (I/O) interface 168, such as a universal asynchronous receiver/transmitter (UART) interface. The digital I/O interface 168 is coupled between the processing device 160 and the PAN radio 158. The digital I/O interface 168 establishes a wired connection over which the processing device 160 sends commands to and receives metric values from the PAN radio 158, as described herein. However, because there is no guarantee that a customer would place the dongle enclosure away from the first enclosure, the performance of either radio could still be impacted. To address this possibility, the embodiments described herein use antenna selection to increase isolation between the two radios. In further embodiments, radiation pattern diversity can be used to further increase isolation between the radios, as described in more detail herein. It should be noted that the embodiments, as described herein, may be used in other architectures that do not have two separate enclosures, but where there is no co-existence support between the two radios. In other words, the embodiments may be used when two radios cannot communicate with one another at a packet level.

FIG. 2 is a network diagram of an electronic product having two devices electronic devices 202, 204 with antenna selection for interference avoidance according to one embodiment. In this embodiment, the electronic product is a webcam 202 with a dongle 204 disposed along a power cable 206. The webcam 202 is a video camera 264 that captures and streams still images and/or video to another device. In some cases, the webcam 202 communicates with a computer that can display the captured video or image(s). In other embodiments, the webcam 202 can communicate with a wireless access point (WAP) 208 as a third device. A WAP is a networking hardware device that allows a WLAN (e.g., Wi-Fi®) compliant device to connect to a wired network. The WAP 208 may connect to a router via a wired network as a standalone device, or the WAP 208 may be a component within a router itself. The webcam 202 can stream image(s) or video to another device over a network, such as the Internet, via the WAP 208. With reference to FIG. 1B, the webcam 202 of FIG. 2 is considered the first device 152 that includes one or more integrated circuits, including the WLAN radio 156 and the processing device 160 that executes the antenna selection engine 162 as described herein. The webcam 202 may also include the digital I/O interface 168 as described with respect to FIG. 1B. The dongle 204 of FIG. 2 is considered the second device 154 that includes one or more integrated circuits, including the PAN radio 158. The dongle 204 may also include other circuitry, such as a digital I/O interface (e.g., UART interface) to communicate with the digital I/O interface 168 of the first device 152. The power cable 206 supplies power to the webcam 202 (first device 152) and the dongle 204 (second device 154).

The dongle 204, via the PAN radio 158, can communicate with a fourth device 210. The fourth device 210 may be a home automation device, such as smart thermostats, smart appliances, smart locks, smart device, smart lighting, security systems, or the like. The fourth device 210 may be other types of network-controlled, network-monitored devices, Internet of Things (IoT) devices, or the like. The dongle 204 communicates with the fourth device 210 over a wireless connection using one or more wireless technologies, such as the Bluetooth® protocol, Bluetooth® LE (BLE) protocol, Zigbee® protocol, Z-Wave® protocol, 6LoWPAN protocol (acronym for IPv6 over Low Power Wireless Personal Area Network), or other PAN or WLAN protocol standards. For example, in one embodiment, the webcam 202 communicates with the WAP 208 and the dongle 204 communicates with a smart lock device that operates to engage and disengage a door lock. In other cases, the fourth device 210 is a gateway device that can communication with other networked devices over a wired connection, using various protocols such as X10, Ethernet, RS-485, power line communication (PLC) standards, or the like.

As described above, a first radio of webcam 202 can have a spatial separation 212 from a second radio of dongle 204 by nature of placing the second radio in the dongle enclosure on the power cable 206. However, since the customer can still place the dongle enclosure close to the webcam 202, the webcam 202 can implement the antenna selection engine 162 to reduce or avoid interference between the two radios as described herein. During operation, the antenna selection engine 162 of webcam 202 can select one of multiple antennas in the webcam 202 according to a selection criterion. In some cases, the criterion can be a robustness of a first signal communicated over a first wireless connection 266

(also referred to as a wireless link) between a first radio of the webcam 202 and a radio of the WAP 208. For example, the criterion can be a robustness of the Wi-Fi® signal over the Wi-Fi® connection when using the Wi-Fi® technology. However, in some cases, a second signal, communicated over a second wireless connection 268 between the second radio of the dongle 204 and a radio of the fourth device 210, is heavily susceptible to detrimental behavior due to interference from the first signal on the first wireless connection 266. So, in other cases, the criterion can be a signal quality of the second signal to the fourth device 210 over the second wireless connection 268, instead of signal robustness of the first signal. For example, in the implementation of the dongle 204 communicating with smart lock device that engages or disengages a door lock using the Zigbee® technology, the criterion can be how good the Zigbee® connection is with the smart lock device. A robustness of the Zigbee® connection can be measured and communicated to the webcam 202, for example, over a wired UART connection, and the antenna selection engine 162 can select an antenna for the Wi-Fi® connection with the WAP 208 based on which results in the best signal over the Zigbee® connection. In this way, even if the customer were to reduce the spatial separation 212 between the dongle 204 and the webcam 202, the interference between the two radios can be reduced or avoided. Additional details of the antenna selection engine 162 are described below with respect to FIGS. 4-5 with respect to the methods 400 and 500. Although the examples provided herein described the dongle 204 using the Zigbee® technology and the webcam 202 using the Wi-Fi® technology, the embodiments can be implemented to any combination of radios that use other wireless technologies where coexistence is an issue. That is, the embodiments described herein can use two radios that operate in the same frequency band or similar frequency bands and the antenna selection technology can reduce or avoid interference that would otherwise impact simultaneous or concurrent operations by the two radios. Also, it should be noted that various embodiments herein are described as using one radio and two antennas in the first device and one radio and one antenna in the second device. In other embodiments, the electronic devices may include different combinations of radios and antennas.

Figure 3:
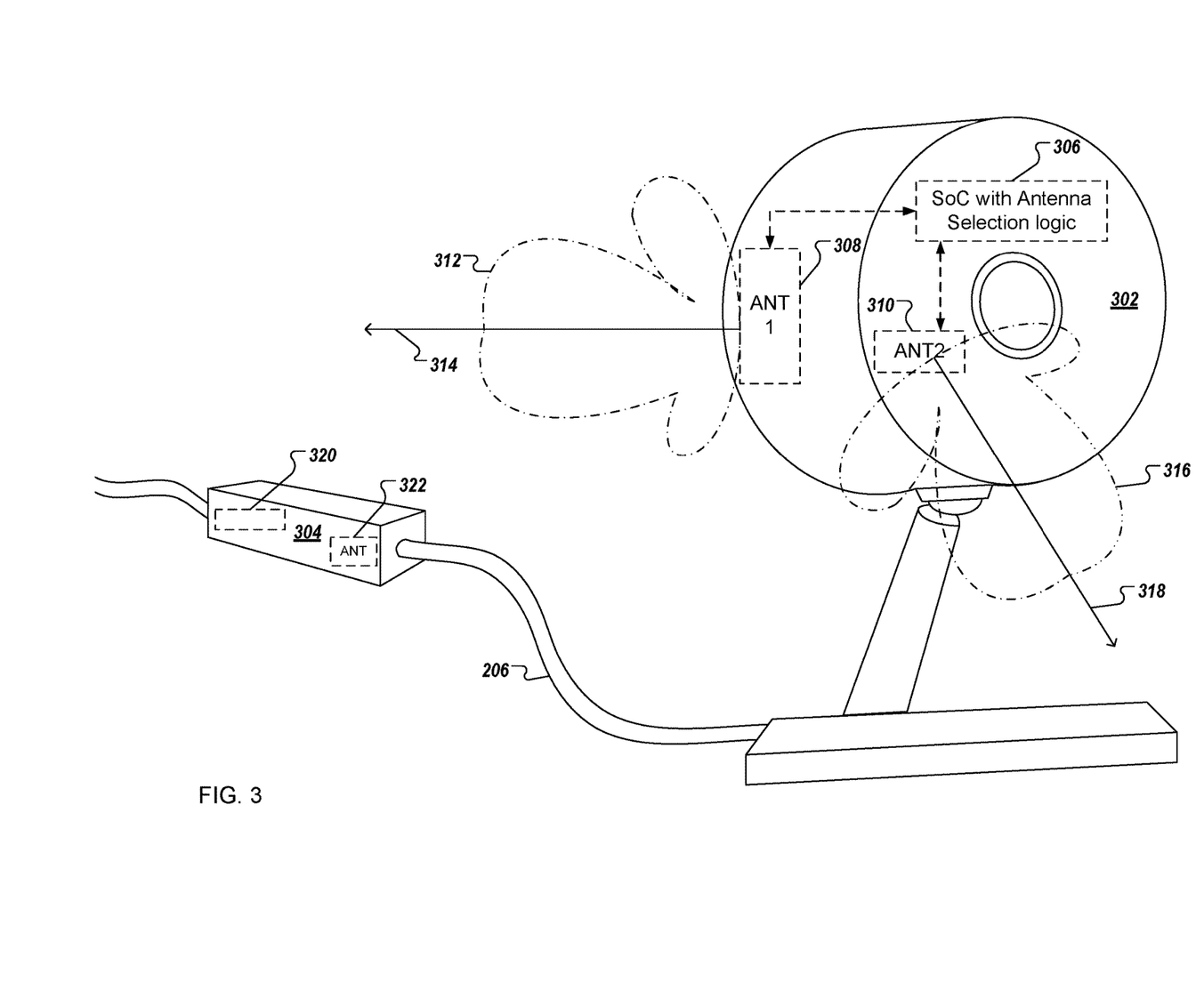
FIG. 3 illustrates a first electronic device with the antenna selection engine and a second electronic device disposed along a power cable of the first electronic device according to one embodiment.

In addition to increasing spatial separation between the radios and selection of one of multiple antennas, other embodiments may provide radiation pattern diversity to reduce or avoid interference. In some embodiments, radiation pattern diversity is achieved by disposing a primary antenna on a first plane within an enclosure and disposing a diversity antenna on a second plane, such as an orthogonal plane, within the enclosure, such as illustrated in FIG. 3. In some cases, the primary antenna can be disposed on a printed circuit board (PCB) and the diversity antenna can be disposed on a flexible printed circuit (FPC) substrate. In another embodiment, the first antenna and the second antenna are co-located antennas within a first enclosure and the third antenna is disposed in a second enclosure for which spatial isolation between the third antenna and the first and second antenna is unknown or is not in fixed positions.

FIG. 3 illustrates a first electronic device 302 with the antenna selection logic and a second electronic device 304 disposed along a power cable of the first electronic device 302 according to one embodiment. The first electronic device 302 is depicted as a webcam as described above, but can be any type of electronic device. The first electronic device 302 includes a SoC 306 with a first radio and antenna selection logic. Alternatively, the first radio can be a standalone integrated circuit coupled to the SoC 306. The first radio of the SoC 306 is coupled to a first antenna 308 and a second antenna 310. The first antenna 308 is disposed on a first plane within a first enclosure. In the depicted embodiment, the first enclosure is a webcam enclosure. The first antenna 308, for example, can be disposed on a PCB disposed in the first plane. The second antenna 310 is disposed on a second plane within the first enclosure. For example, the second antenna 310 can be disposed on a FCP substrate contained within the first enclosure. The first antenna 308 may be a primary antenna and the second antenna 310 can be a diversity antenna coupled to a WLAN radio that operates in the 2.4 GHz ISM band. The first radio causes the first antenna 308 to radiate electromagnetic energy in a first radiation pattern 312. A main beam of the radiation pattern 312 can radiate in a first direction 314. The first radio (or another radio of the SoC 306) causes the second antenna 310 to radiate electromagnetic energy in a second radiation pattern 316. A main beam of the second radiation pattern 316 can radiate in a second direction 318 that is different than the first direction 314.

The second electronic device 304 is depicted as a dongle enclosure disposed along a power cable (or other type of cable) that is coupled to the first enclosure as described above, but can be any type of electronic device. The second electronic device 304 can include a wired connection (e.g., wired UART connection) with the first electronic device 302. In other embodiments, the second electronic device 304 can communicate with the first electronic device 302 over a wireless connection. The second electronic device 304 includes circuitry 320 and a third antenna 322. The circuitry 320 may include at least a second radio, but may also include a processing device, a digital I/O interface, or other circuitry depending on the type of electronic device. The second radio is coupled to a third antenna 322 disposed within or on the dongle enclosure. The third antenna 322 can be disposed within the dongle enclosure, such as on a PCB, a FCP substrate, or the like. The second radio operates in the same frequency band or similar frequency bands as the frequency band of the first radio. For example, the first radio may be a WLAN radio that operates in the 2.4 GHz ISM band and the second radio may be a PAN radio that also operates in the 2.4 GHz ISM band.

As described above, the first radiation pattern 312 and the second radiation pattern 316 are different radiation patterns. In some cases when the first radio is operating in a diversity mode where both antennas are used, a null in the first radiation pattern 312 as deep as 20 dB can be covered by the presence of the second radiation pattern 316 by the diversity antenna. As illustrated in FIG. 3, the radiation patterns can be similar in shape and size, but still be different radiation patterns because of the direction of the main beams. In some cases, the locations within the enclosure create different radiation patterns as described above. In other cases, the first radiation pattern 312 can have a first polarization and the second radiation pattern 316 can have a second polarization that is different than the first polarization (e.g., orthogonal polarization) to create radiation pattern diversity. In other cases, other types of antennas can be used to create different radiation patterns. For example, the first antenna can be a first type of antenna that generates a first radiation pattern and the second antenna can be a second type that generates a second radiation pattern than is different than the first radiation pattern. In other cases, the first antenna 308, the second antenna 310, or any combination thereof can be a beam-steering antenna that can be controlled to create different radiation patterns. For example, the SoC 306 can control the beam-steering antenna to change direction(s) to create a radiation pattern that is different than a radiation pattern of the other antenna. The beam-steering antenna can be electronically controlled in both azimuth plane and elevation plane, for examples. The different radiation patterns by the primary and diversity antennas can be leveraged to use in intelligent antenna selection by the antenna selection logic. For example, the first antenna 308 and second antenna 310 can be disposed on orthogonal planes and radiate similar radiation patterns, but the main beams can radiate in orthogonal directions.

During operation of the first radio and the second radio, one of the first radiation pattern 312 and the second radiation pattern 316 can interfere less within the second radio than the other. In such cases, the SoC 306 with antenna selection logic can determine which of the first antenna 308 and the second antenna 310 perform better with the second radio. For example, the antenna selection logic can send commands to the second radio to measure a first amount of power received on the third antenna 322 when the first radio is transmitting data packets with only the first antenna 308 and a second amount of power received on the third antenna 322 when the first radio is transmitting data packets with only the second antenna 310. The antenna selection logic can select the first antenna 308 when the first amount is lower than the second amount. When the second amount is lower than the first amount, the antenna selection logic can select the second antenna 310. This intelligent antenna selection can be used for interference avoidance so that the first radio and the second radio can operate simultaneously or concurrently.

In another embodiment, a processing device of a first electronic device sends a first command to a second radio of a second electronic device to measure a first amount of power received on a third antenna coupled to the second radio during a first period. During the first period, a first radio of the first electronic device transmits a sequence of data packets using a first antenna of the first electronic device. The processing device receives from the second electronic device a first metric value indicative of the first amount of power received on the third antenna during the first period. The processing device sends a second command to the second electronic device to measure a second amount of power received on the third antenna during a second period. During the second period, the first radio transmits the sequence of data packets using a second antenna of the first electronic device. The processing device receives from the second electronic device a second metric value indicative of the second amount of power received on the third antenna during the second period. The processing device selects one of the first antenna and the second antenna as a selected antenna to communicate data with a third device based on which one of the first metric value and the second metric value is lower. The processing device communicates, via the first radio, the data with the third device using the selected antenna.

In a further embodiment, the processing device sends a third command to the second electronic device to set the second radio into a channel sweep mode in which the second radio measures a first power spectral density (PSD) measurement for the first metric value during the first period. The processing device sends a fourth command to the second electronic device to restart the channel sweep mode after which the second electronic device measures a second PSD measurement during for the second metric value the second period. In a further embodiment, the processing device communicates, by the second radio, additional data with a fourth device concurrently while the first radio communicates the data with the third device using the selected antenna. As described herein, the first electronic device may be a webcam and the processing device sends one or more signals to a camera to capture an image or a video.

Additional details of the operations of the antenna selection logic are described below with respect to FIGS. 4-5.

Figure 4:
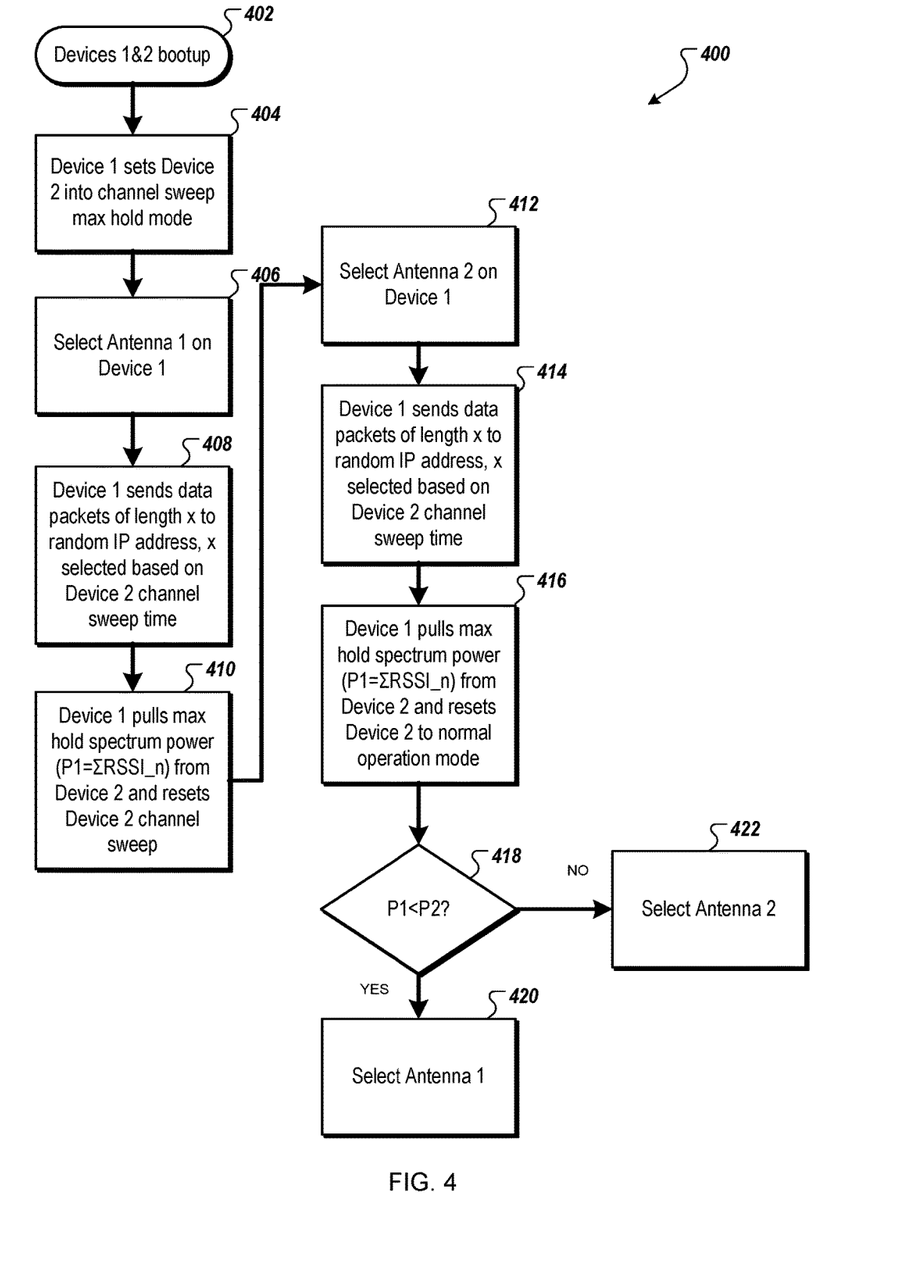
FIG. 4 is a flow diagram of a method of antenna selection by a first device for interference avoidance according to one embodiment.

FIG. 4 is a flow diagram of a method 400 of antenna selection by a first device for interference avoidance according to one embodiment. The method 400 may be at least partially performed by processing logic that may include hardware (e.g., circuitry, dedicated logic, programmable logic, microcode, etc.), software (e.g., instructions executed by a processing device), firmware, or any combination thereof. The method 400 may be performed by the antenna selection engine 162 of FIGS. 1B and 2. The method 400 may be performed by the SoC 306 with the antenna selection logic of FIG. 3. Alternatively, any of the processing devices, or other circuits, of the electronic devices described herein may perform some or all of the method 400.

Referring to FIG. 4, the method 400 begins with the processing logic of a first device, including a first radio coupled to a first antenna and a second antenna, booting or otherwise powering up the first device, whereas the processing logic of a second device, including a second radio coupled to a third antenna, booting or otherwise powering up the second device (block 402). The processing logic of the first device sets the second device into a channel sweep mode to measure a max hold spectrum power (also referred to as a channel sweep max hold mode) (block 404). The processing logic of the first device selects the first antenna (block 406). The processing logic sends data packets of length x to a destination address, such as an random or arbitrary IP address, where x is selected based on a channel sweep time for the second device (block 408). The processing logic of the first device receives a first amount of power (P1) received by the third antenna on multiple of channels of the second radio (block 410). In one embodiment, the first device pulls the max hold spectrum power (P1=ΣRSSI_n) from the second device. At block 410, the processing logic restarts the channel sweep mode on the second device.

At block 412, the processing logic selects the second antenna. The processing logic sends data packets of length x to the destination address (e.g., arbitrary or random IP address), where x is selected based on the channel sweep time on the second device (block 414). The processing logic of the first device receives a second amount of power (P2) received by the third antenna on multiple of channels of the second radio (block 416). In one embodiment, the first device pulls the max hold spectrum power (P2=ΣRSSI_n) from the second device. At block 416, the processing logic restarts the second device to a normal operation mode. At block 418, the processing logic determines whether the first amount (P1) is less than the second amount (P2). The processing logic selects the first antenna at block 420 when the first amount is less than the second amount. The processing logic selects the second antenna at block 422 when the first amount is not less than the second amount. The method 400 ends. The method 400 can be performed at boot-up, as well as regular or schedule intervals, or in response to a command to check.

Figure 5:
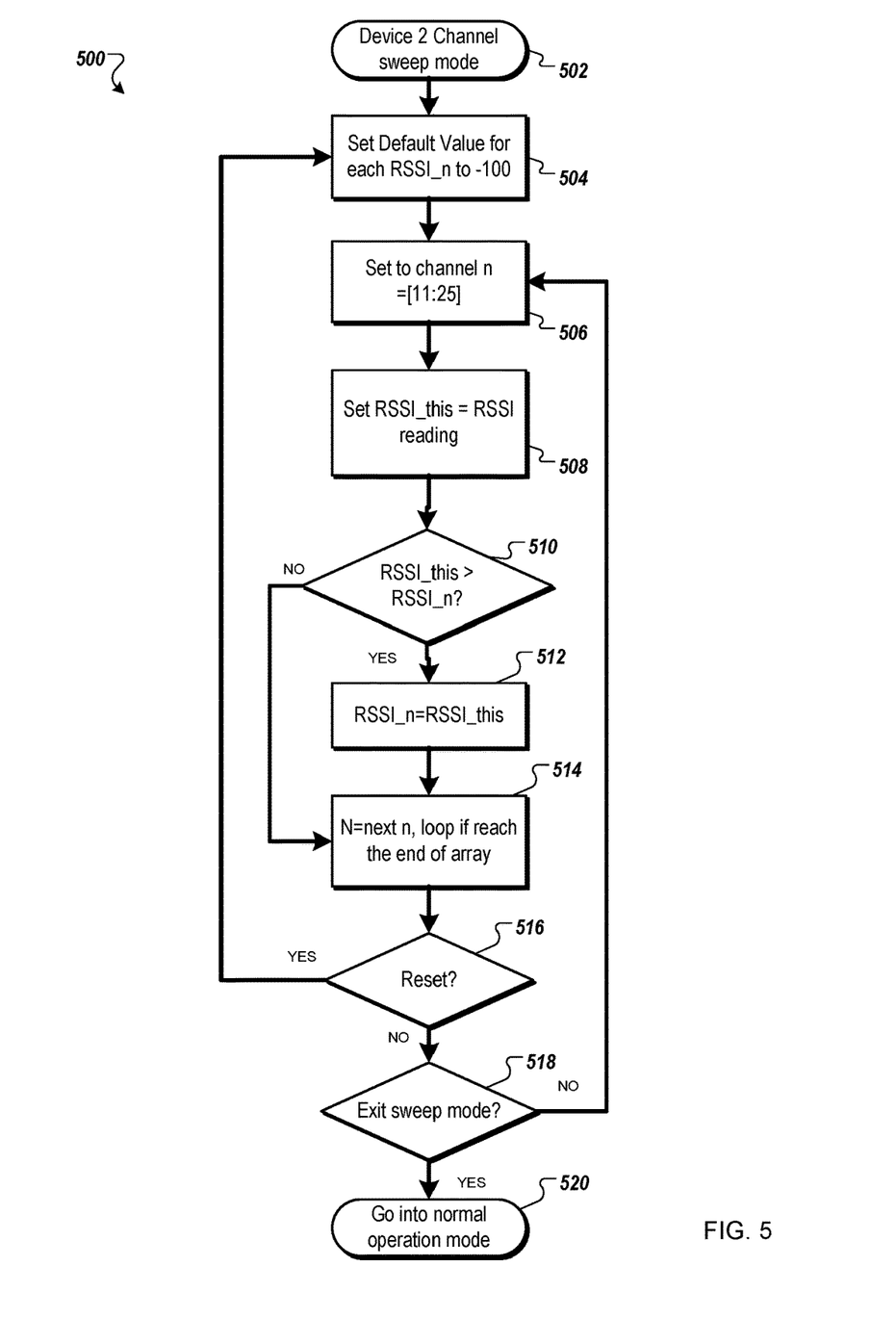
FIG. 5 is a flow diagram of a method of measuring power by a second device for interference avoidance according to one embodiment.

FIG. 5 is a flow diagram of a method of measuring power by a second device for interference avoidance according to one embodiment. The method 500 may be at least partially performed by processing logic that may include hardware (e.g., circuitry, dedicated logic, programmable logic, microcode, etc.), software (e.g., instructions executed by a processing device), firmware, or any combination thereof. The method 500 may be performed by the second radio 158 of FIG. 1B, or the dongle 204 of FIG. 2, the circuitry 320 of FIG. 3. Alternatively, any of the processing devices, or other circuits, of the electronic devices described herein may perform some or all of the method 500.

Referring to FIG. 5, the method 500 begins with the processing logic of the second device sets the second radio in a channel sweep mode (block 502). The processing logic sets a default value for each receive signal strength indicator (RSSI) value. For example, the processing logic sets the default value to a large negative number (e.g., each RSSI_n to −100 dBm). The processing logic sets the second radio to a first of n channels (e.g., channel n=[11:25]) (block 506). The processing logic sets a current reading based on a measured reading by the second radio (block 508) (set RSSI_this=RSSI_reading) and determines if the current reading is greater than the default value (RSSI_n) (block 510). When the processing logic determines that the current reading is greater than the default value at block 510, the processing logic sets the current reading as the default value (RSSI_n=RSSI_this) and proceeds to block 514 to increment a count of n (N=next n, loop if reach the end of array). When the processing logic determines that the current reading is greater than the default value at block 510, the processing logic skips the operation at block 512 and proceeds to block 514 to increment the count n. At block 516, the processing logic determines if the second device receives a restart command from the first device. If so, the processing logic returns to block 504. If not, the processing logic determines if the second device receives an exit sweep mode command from the first device (block 518). If not, the processing logic returns to block 506; otherwise, the processing logic goes into normal operation mode (block 520), and the method 500 ends.

Figure 6:
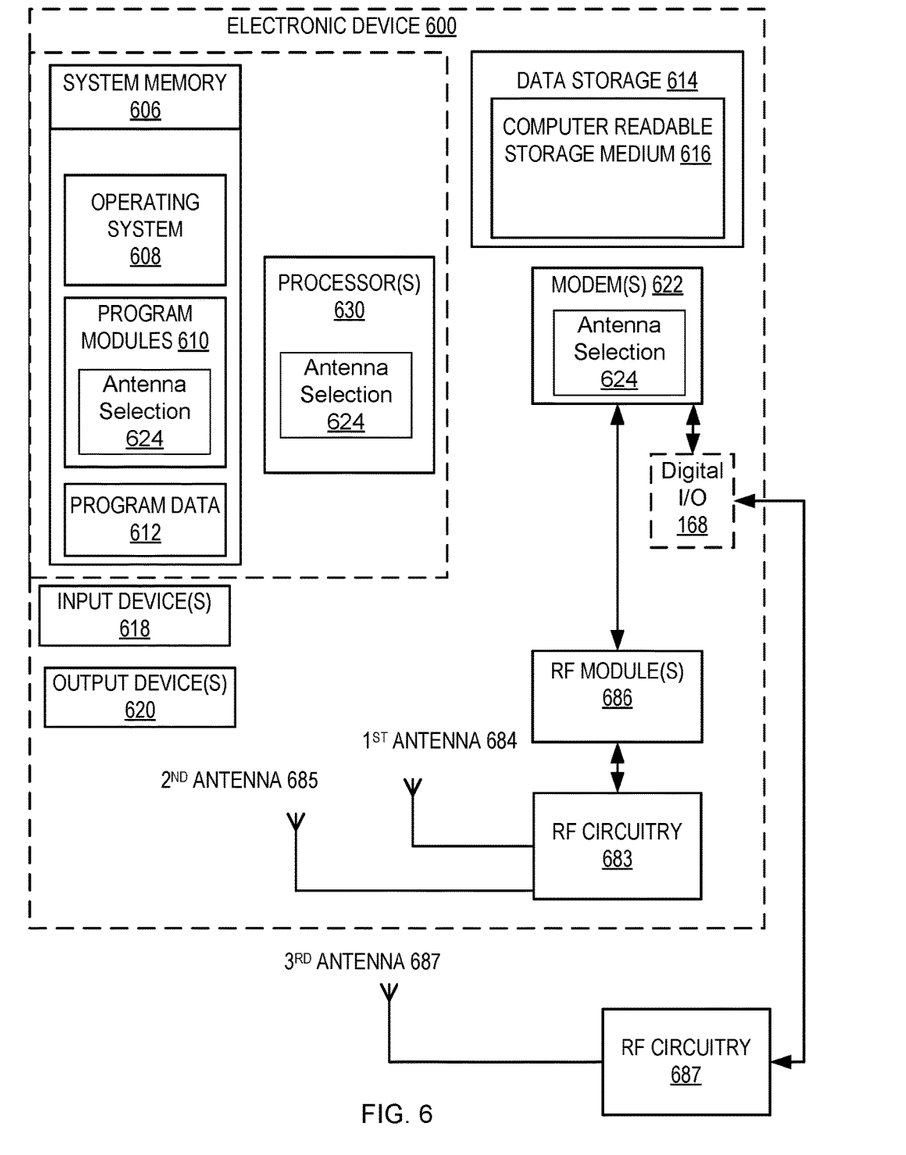
FIG. 6 is a block diagram of an electronic device with antenna selection functionality according to one embodiment.

FIG. 6 is a block diagram of an electronic device 600 with antenna selection functionality according to one embodiment. The electronic device 600 may correspond to any one of the network hardware device described herein. The electronic device 600 includes one or more processor(s) 630, such as one or more CPUs, microcontrollers, field programmable gate arrays, or other types of processors. The electronic device 600 also includes system memory 606, which may correspond to any combination of volatile and/or non-volatile storage mechanisms. The system memory 606 stores information that provides operating system component 608, various program modules 610, antenna selection module 624, program data 612, and/or other components. In one embodiment, the system memory 606 stores instructions of methods to control operation of the electronic device 600. The electronic device 600 performs functions by using the processor(s) 630 to execute instructions provided by the system memory 606.

The electronic device 600 also includes a data storage device 614 that may be composed of one or more types of removable storage and/or one or more types of non-removable storage. The data storage device 614 includes a computer-readable storage medium 616 on which is stored one or more sets of instructions embodying any of the methodologies or functions described herein. Instructions for the program modules 610 may reside, completely or at least partially, within the computer-readable storage medium 616, system memory 606 and/or within the processor(s) 630 during execution thereof by the electronic device 600, the system memory 606 and the processor(s) 630, also constituting computer-readable media. The electronic device 600 may also include one or more input devices 618 (keyboard, mouse device, specialized selection keys, etc.) and one or more output devices 620 (displays, printers, audio output mechanisms, etc.).

The electronic device 600 further includes a modem 622 to allow the electronic device 600 to communicate via a wireless connections (e.g., such as provided by the wireless communication system) with other computing devices, such as remote computers, an item providing system, and so forth. The modem 622 can be connected to one or more RF modules 686, 687. The RF modules 686, 697 may be a WLAN module, a WAN module, PAN module, GPS module, a 60 GHz radio, a 5 GHz radio, or the like, as described herein. The antenna structures (antenna(s) 684, 685) are coupled to the RF circuitry 683, which is coupled to the modem 622. The RF circuitry 683 may include radio front-end circuitry, antenna switching circuitry, impedance matching circuitry, or the like. The antennas 684, 685 may be GPS antennas, NFC antennas, other WAN antennas, WLAN or PAN antennas, beam-steering antennas, fixed-beam antennas, or the like. The modem 622 allows the electronic device 600 to handle both voice and non-voice communications (such as communications for text messages, multimedia messages, media downloads, web browsing, etc.) with a wireless communication system. The modem 622 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

In a further embodiment, the electronic device 600 includes a digital I/O interface 168. The digital I/O interface 168 is coupled to RF circuitry 687, which is coupled to the antenna structure 687. The digital I/O interface 168 establishes a wired connection over which the processor 630 or the modem 622 can send commands to and receives metric values from the RF circuitry 686, as described herein.

The modem 622 may generate signals and send these signals to antenna(s) 684 of a first type (e.g., WLAN type antenna) and antenna(s) 685 of the first type), via RF circuitry 683, and RF module(s) 686, and/or antenna(s) 687 of a third type (e.g., PAN type antenna), via RF circuitry 686, as descried herein. Antennas 684, 685, 687 may be configured to transmit in different frequency bands and/or using different wireless communication protocols. The antennas 684, 685, 687 may be directional, omnidirectional, or non-directional antennas. In addition to sending data, antennas 684, 685, 687 may also receive data, which is sent to appropriate RF modules connected to the antennas. One of the antennas 684, 685, 687 may be any combination of the antenna structures described herein.

In one embodiment, the electronic device 600 establishes a first connection using a first wireless communication protocol using one of the antennas 684, 685, and a second connection using a different wireless communication protocol using the antenna 687. The first wireless connection and second wireless connection may be active concurrently, for example, if a network hardware device is receiving a media item from another network hardware device via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure or a second antenna structure and the second wireless connection is associated with a third antenna structure. In other embodiments, the first wireless connection may be associated with communications within a LAN and the second wireless connection may be associated with communications within a PAN, as described herein.

Though a modem 622 is shown to control transmission and reception via antenna (684, 685, 687), the electronic device 600 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A system comprising:
   a first electronic device comprising:
      an enclosure;
      a processing device disposed within the enclosure;
      a wireless local area network (WLAN) radio coupled to the processing device;
      a primary antenna coupled to the WLAN radio and disposed within the enclosure; and
      a diversity antenna coupled to the WLAN radio and disposed within the enclosure, wherein the WLAN radio is to cause the primary antenna, the diversity antenna, or both to radiate electromagnetic energy in an industrial, scientific and medical (ISM) radio band; and
   a second electronic device disposed within a dongle enclosure, the dongle enclosure being part of a power cable configured to supply power to the first electronic device and the second electronic device, wherein the second electronic device comprises a personal area network (PAN) radio and a third antenna coupled to the PAN radio, wherein the PAN radio is to cause the third antenna to radiate electromagnetic energy in the ISM radio band, wherein the processing device is to:
      set the PAN radio into a channel sweep mode in which the PAN radio measures an amount of power received by the third antenna on a plurality of channels of the PAN radio;
      cause the WLAN radio to transmit a sequence of data packets using only the primary antenna during a first period;
      cause the WLAN radio to transmit the sequence of data packets using only the diversity antenna during a second period;
      receive a first metric from the PAN radio, the first metric indicative of a first amount of power received on the third antenna on the plurality of channels during the first period;
      receive a second metric from the PAN radio, the second metric indicative of a second amount of power received on the third antenna on the plurality of channels during the second period;

select one of the primary antenna or the diversity antenna as a selected antenna based on which of the first metric and the second metric is lower;

cause the WLAN radio to communicate WLAN data with a third device using the selected antenna during a third period, wherein the third period is after the first period and the second period; and cause the PAN radio to communicate PAN data with a fourth device using the third antenna during the third period, wherein at least a portion of the WLAN data and at least a portion of the PAN data are communicated concurrently in the ISM radio band.

2. The system of claim 1, wherein the first electronic device comprises a camera coupled to the processing device, wherein the primary antenna is disposed on a first plane within the enclosure and the diversity antenna is disposed on a second plane within the enclosure, the second plane being orthogonal to the first plane.

3. The system of claim 1, wherein the first electronic device comprises a universal asynchronous receiver/transmitter (UART) interface coupled between the processing device and the PAN radio.

4. An electronic device comprising:
a first antenna;
a second antenna;
a first radio coupled to the first antenna and the second antenna, wherein the first antenna is to radiate electromagnetic energy in a first radiation pattern and the second antenna is to radiate electromagnetic energy in a second radiation pattern that is different than the first radiation pattern; and
a processing device coupled to the first radio, the processing device to:
send a first command to a second radio of a second electronic device to measure a first amount of power received on a third antenna coupled to the second radio during a first period, wherein the second electronic device is part of a power cable configured to supply power to the electronic device;
during the first period, cause the first radio to transmit a sequence of data packets using the first antenna;
receive, from the second electronic device, a first metric value indicative of the first amount of power received on the third antenna during the first period;
send a second command to the second radio to measure a second amount of power received on the third antenna during a second period;
during the second period, cause the first radio to transmit the sequence of data packets using the second antenna;
receive, from the second electronic device, a second metric value indicative of the second amount of power received on the third antenna during the second period;
determine that the first metric value is lower than the second metric value;
select the first antenna to communicate data with a third device; and
cause the first radio to communicate the data with the third device using the first antenna.

5. The electronic device of claim 4, wherein the first radio is a wireless local area network (WLAN) radio operating in a 2.4 GHz band.

6. The electronic device of claim 5, wherein the second radio is a personal area network (PAN) radio.

7. The electronic device of claim 4, wherein the first radio uses a first wireless technology standard and the second radio uses a second wireless technology standard that is different than the first wireless technology standard.

8. The electronic device of claim 4, wherein the processing device is further to:
send a third command to the second electronic device to set the second radio into a channel sweep mode in which the second radio measures the first metric value during the first period, wherein the first metric value is a first power spectral density (PSD) measurement; and
send a fourth command to the second electronic device to restart the channel sweep mode after which the second electronic device measures the second metric value during the second period, wherein the second metric value is a second PSD measurement.

9. The electronic device of claim 4, further comprising a camera coupled to the processing device, wherein the first antenna is disposed on a first plane within an enclosure and the second antenna is disposed on a second plane within the enclosure, the second plane being orthogonal to the first plane.

10. The electronic device of claim 4, wherein the first radiation pattern has a first polarization and the second radiation pattern has a second polarization that is orthogonal to the first polarization.

11. The electronic device of claim 4, wherein the first antenna and the second antenna are co-located antennas within a first enclosure, and wherein the third antenna is disposed in a second enclosure spatially separated from the first enclosure.

12. The electronic device of claim 11, wherein the second enclosure is part of a power cable coupled to the first enclosure.

13. The electronic device of claim 4, further comprising a digital input-output (I/O) interface coupled between the processing device and the second radio, the digital I/O interface to establish a wired connection over which the processing device sends the first command and the second command to the second radio and receives the first metric value and the second metric value from the second radio.

14. The electronic device of claim 13, wherein the digital I/O interface is a universal asynchronous receiver/transmitter (UART) interface coupled between the processing device and the second radio.

15. A method comprising:
sending, by a first electronic device via a wired interface, a first command to a second radio of a second electronic device to measure a first amount of power received on a third antenna coupled to the second radio during a first period;
during the first period, transmitting, by a first radio of the first electronic device, a sequence of data packets using a first antenna of the first electronic device;
receiving, from the second electronic device via the wired interface, a first metric value indicative of the first amount of power received on the third antenna during the first period;
sending, by the first electronic device via the wired interface, a second command to the second electronic device to measure a second amount of power received on the third antenna during a second period;
during the second period, transmitting, by the first radio, the sequence of data packets using a second antenna of the first electronic device;

receiving, from the second electronic device via the wired interface, a second metric value indicative of the second amount of power received on the third antenna during the second period;

determining, by the first electronic device, that the first metric value is lower than the second metric value;

selecting the first antenna to communicate data with a third device; and communicating, by the first radio, the data with the third device using the first antenna.

16. The method of claim 15, further comprising:

sending a third command to the second electronic device via the wired interface to set the second radio into a channel sweep mode in which the second radio measures the first metric value during the first period, wherein the first metric value is a first power spectral density (PSD) measurement; and sending a fourth command to the second electronic device via the wired interface to restart the channel sweep mode after which the second electronic device measures the second metric value during the second period, wherein the second metric value is a second PSD measurement.

17. The method of claim 15, further comprising sending a signal to a camera of the first electronic device to capture an image or a video.

18. The method of claim 15, further comprising communicating, by the second radio, additional data with a fourth device concurrently while the first radio communicates the data with the third device using the first antenna.

19. The method of claim 15, wherein the wired interface is a digital input-output (I/O) interface.

20. The method of claim 15, wherein the wired interface is a universal asynchronous receiver/transmitter (UART) interface.

* * * * *